United States Patent
Krepner et al.

(10) Patent No.: US 8,347,153 B2
(45) Date of Patent: Jan. 1, 2013

(54) PROTOCOL AWARE ERROR RATIO TESTER

(75) Inventors: Shlomi Krepner, Sunnyvale, CA (US);
Yigal Shaul, Cupertino, CA (US)

(73) Assignee: Teledyne LeCroy, Inc., Thousand Oaks, CA (US)

(*) Notice: Subject to any disclaimer, the term of this patent is extended or adjusted under 35 U.S.C. 154(b) by 487 days.

(21) Appl. No.: 12/248,959

(22) Filed: Oct. 10, 2008

(65) Prior Publication Data

US 2010/0095166 A1    Apr. 15, 2010

(51) Int. Cl.
     *G06F 11/263*      (2006.01)
     *G06F 11/30*      (2006.01)

(52) U.S. Cl. ........................... 714/704; 714/712

(58) Field of Classification Search .................. None
See application file for complete search history.

(56) References Cited

U.S. PATENT DOCUMENTS

| | | | | |
|---|---|---|---|---|
| 5,014,272 A * | 5/1991 | Yoshida | ........................ | 370/513 |
| 6,094,737 A * | 7/2000 | Fukasawa | ..................... | 714/738 |
| 6,173,017 B1 * | 1/2001 | Marz | .............................. | 375/295 |
| 6,577,696 B1 * | 6/2003 | Burgmeier et al. | ............ | 375/376 |
| 7,254,755 B2 * | 8/2007 | de Obaldia et al. | ........... | 714/715 |
| 2004/0083077 A1 * | 4/2004 | Baumer et al. | ................. | 702/185 |
| 2005/0283697 A1 * | 12/2005 | Kang et al. | ..................... | 714/742 |
| 2005/0286436 A1 * | 12/2005 | Flask | .............................. | 370/252 |
| 2007/0002990 A1 * | 1/2007 | Lee et al. | ....................... | 375/355 |
| 2007/0100596 A1 * | 5/2007 | Hollis | .............................. | 703/14 |
| 2008/0130508 A1 * | 6/2008 | Vikstedt et al. | ................ | 370/241 |

FOREIGN PATENT DOCUMENTS

KR     2002030324 A   *   4/2002

\* cited by examiner

*Primary Examiner* — Ajay Bhatia
*Assistant Examiner* — Dipakkumar Gandhi
(74) *Attorney, Agent, or Firm* — Gordon Kessler

(57) ABSTRACT

A method and an apparatus for testing the physical layer of high speed serial communication devices and systems with protocol awareness is disclosed. The apparatus comprises of two major blocks: a General Purpose Platform (GPP) and an Analog Front End (AFE). Physical layer testing is divided into two sets of testing procedures: Receiver and Transmitter testing. This test system can be used in a traditional BERT setting where the test system commands the Device Under Test (DUT) to be placed into either a loop back mode, or into a more advanced mode where the test system is communicating with the DUT on a protocol level and counts the frame error ratio (FER). This FER is protocol dependent and each protocol receiver has its own way of reporting transmission errors to the transmitter. The protocol awareness of this invention is capable of detecting such a level of errors.

19 Claims, 4 Drawing Sheets

PROTOCOL AWARE ERROR RATIO TESTER

BACKGROUND

This invention relates to test systems intended for test and measurement of the physical layer of high speed serial communication protocols and technologies.

Traditional testing of high speed communication channels requires multiple pieces of expensive test equipment. The test equipment is expected to perform testing of data on one or more particular communication channels. In some cases, currently available equipment is not able to perform a particular desired test because of a lack of understanding by the test instrument of a protocol defining a data format of the data to be tested. Various proprietary solutions using extensive test equipment at significant cost have been tried as well. In addition, proprietary software code must be specifically developed to coordinate the functioning of these products and allow the combination to perform a particular desired test. Thus, transceiver testing based on currently available test modes in the Serial Attached SCSI (SAS) and Serial Advanced Technology Attachment (SATA) standards, for example, are very complicated to create in the lab due to equipment limitations.

SUMMARY

The inventors of the present invention have recognized that testing for protocol physical layer errors has become a difficult proposition. Existing tools may currently be used to test for protocol bit errors, however, they have one or more particular drawbacks. A Bit Error Ratio (BER) Test for example is typically performed using a serial or parallel Bit Error Ratio Tester (BERT). Because the test using a BERT is performed at a level that only recognizes errors in individual bits, the BERT has no knowledge of whether a particular Cyclic Redundancy Check (CRC) or higher level error checking scheme is in use. The BERT also does not have any knowledge regarding packet boundaries that may be defined in accordance with a particular protocol definition in use by devices in communication When being tested by such a BERT, if two errors fall in a same protocol defined logical packet, for example, the BERT would count two errors. However, at the protocol level, because the specification defining the protocol is based on counting packet errors, there should only be one error recorded.

In addition, a traditional BERT cannot put SAS and SATA devices into a loopback state. Thus, users are forced to first use a protocol generator/exerciser to place these devices under test in this particular state, and then connect the BERT to the device under test to perform the test. Many times this sequence of events may cause the DUT to lose a connection link and disconnect or otherwise fail to properly test the device under test.

As described above, it would therefore be desirable to be able to perform physical layer testing of a device using only features in the device that are "required" by a protocol specification and not using special control programs and multiple test tools.

In accordance with the invention, to accomplish this testing, a Device Under Test (DUT) is preferably placed into one of the following test states:

BIST (Built In Self-Test) retimed or direct loopback mode. In this mode the DUT is instructed to send back the same bits after or before the bits are provided into internal sampling circuitries Application level loop. In this mode information is looped back to the sending device after the bits are passed through all protocol layers up to the application level Live traffic mode. In this mode an error count is calculated at the frame level. A receiver is instructed to acknowledge every packet of information it receives with a low level packet or symbol acknowledge. If no such acknowledge is provided, the transmitter is able to determine that there was one or more bit errors in the last frame it provided to the device under test.

When in any of these states, in order to perform desired testing, patterns that are stressed in amplitude, timing and jitter are transmitted to the device under test. The device under test processes the received patterns based upon the particular current test state. The returned bits/frames arc examined for any errors and a count is kept of total number of bits/frames and bit/frame errors. In accordance with the invention, such testing is able to be performed in a standard operating environment. As noted above, it is not possible to perform this type of measurement with an ordinary BERT because of its inability to test the device in such a standard operating environment. For example, in SAS/SATA protocols the returned frames may have additional ALIGNS which prevent sync from being obtained. The aforementioned existing equipment is unable to deal with this, as well as other situations. Thus the user is required to overcome this limitation by connecting the clock domains of the Rx and TX in the unit under test. As a result, current testing does not effectively test the device under test in its real mode of operation.

Thus, in accordance with the invention, a protocol aware Error Ratio Tester is provided that allows a user to be able to perform desired physical layer testing, as in part described above.

The invention preferably comprises two modules. A first module is a GPP (General Purpose Platform) that is responsible for protocol awareness. A second module is an AFE (Analog Front End) that is responsible for high quality signal generation and addition of various jitter components and signal waveform shaping. These functions allow the user to gain unprecedented control over the transmitted signal and to emulate real system conditions without the need for multiple hooks to external passive (PCBs for example) or active (signal and waveform generators for example) devices. Operating software in accordance with the invention allows for control of the new AFE module functionality, control of the bit error test (or frame error test), construction and generation of test patterns, knowledge of any appropriate FPGA code to perform required checking on the returned frames, and tracking of any accumulated statistics.

Still other objects and advantages of the invention will be apparent from the specification and the drawings.

BRIEF DESCRIPTION OF DRAWINGS

For a more complete understanding of the invention, a reference is made to the following description and accompanying drawings, in which.

DETAILED DESCRIPTION OF THE PREFERRED EMBODIMENTS

A detailed description of illustrative embodiments will now be provided, making reference to the figures and providing details of the information flow. Like reference numbers and designations in the various figures indicate like elements.

Figure 1:
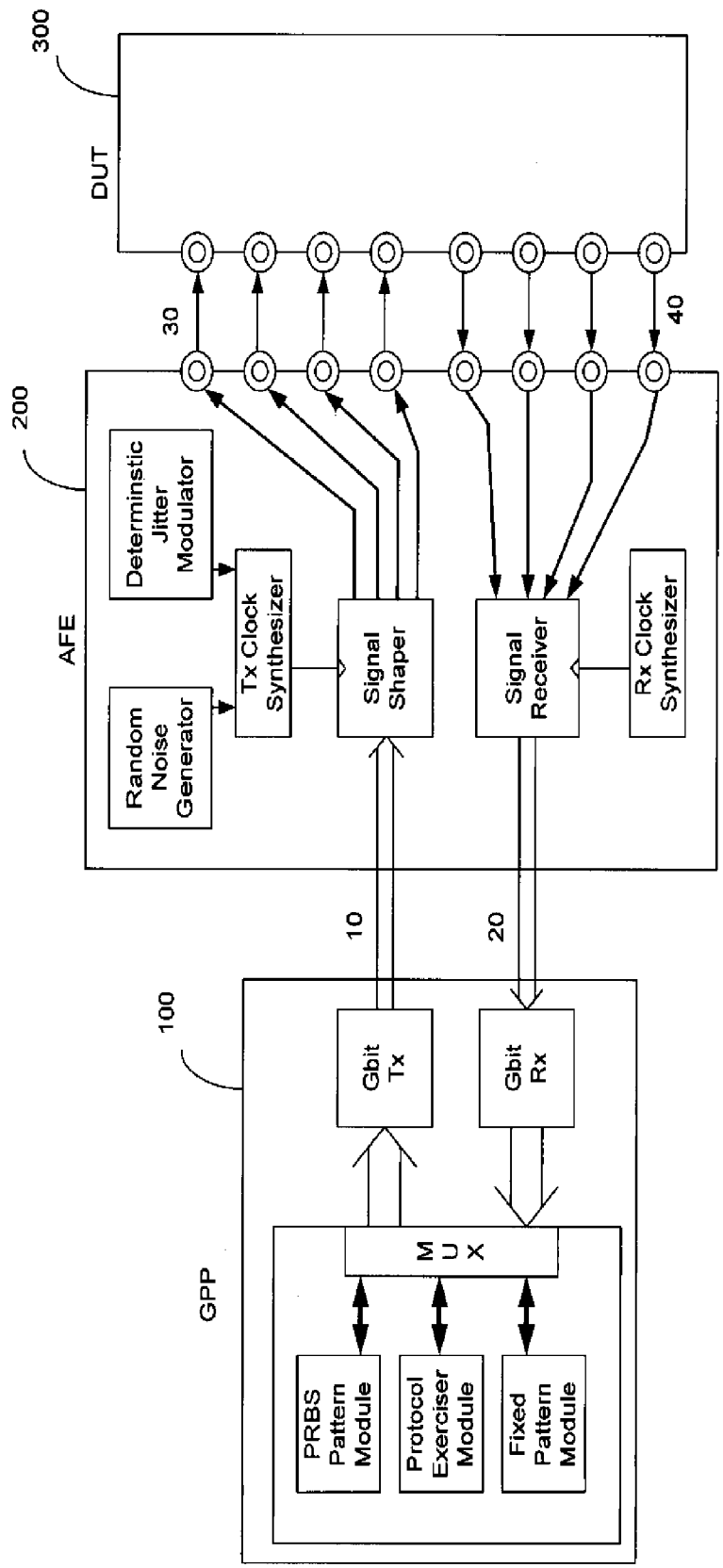
FIG. 1 depicts a system block diagram which includes a General Purpose Processing (GPP) unit, an Analog Front End (AFE), and their connections to a Device or System Under Test (DUT) in accordance with the invention.

FIG. 1 depicts a preferred embodiment of the invention. The invention will be described with respect to a method used to test and measure errors on a serial communication link. A GPP unit 100 is responsible for higher level protocol awareness, as is known in the art according to protocol exercisers that are currently available. Such a GPP unit is capable of connecting to a system or device under test and communicating with the device on all protocol levels of interest. However, it is known that the GPP generates signals 10 that are not able to be appropriately controlled and are not clean and accurate enough to be used in an effort to evaluate physical layer link and device receiver characteristics. In order to achieve signals of such high fidelity and controllability, an AFE unit 200 is preferably attached to GPP 100. AFE unit 200 receives signals generated by GPP unit 100 and is responsible for generating a clean signal with a predetermined, programmed and calibrated amount of jitter and signal shaping as defined by the user in order to stress signals 30 that are being transmitted to the DUT (unit 300).

Figure 2:
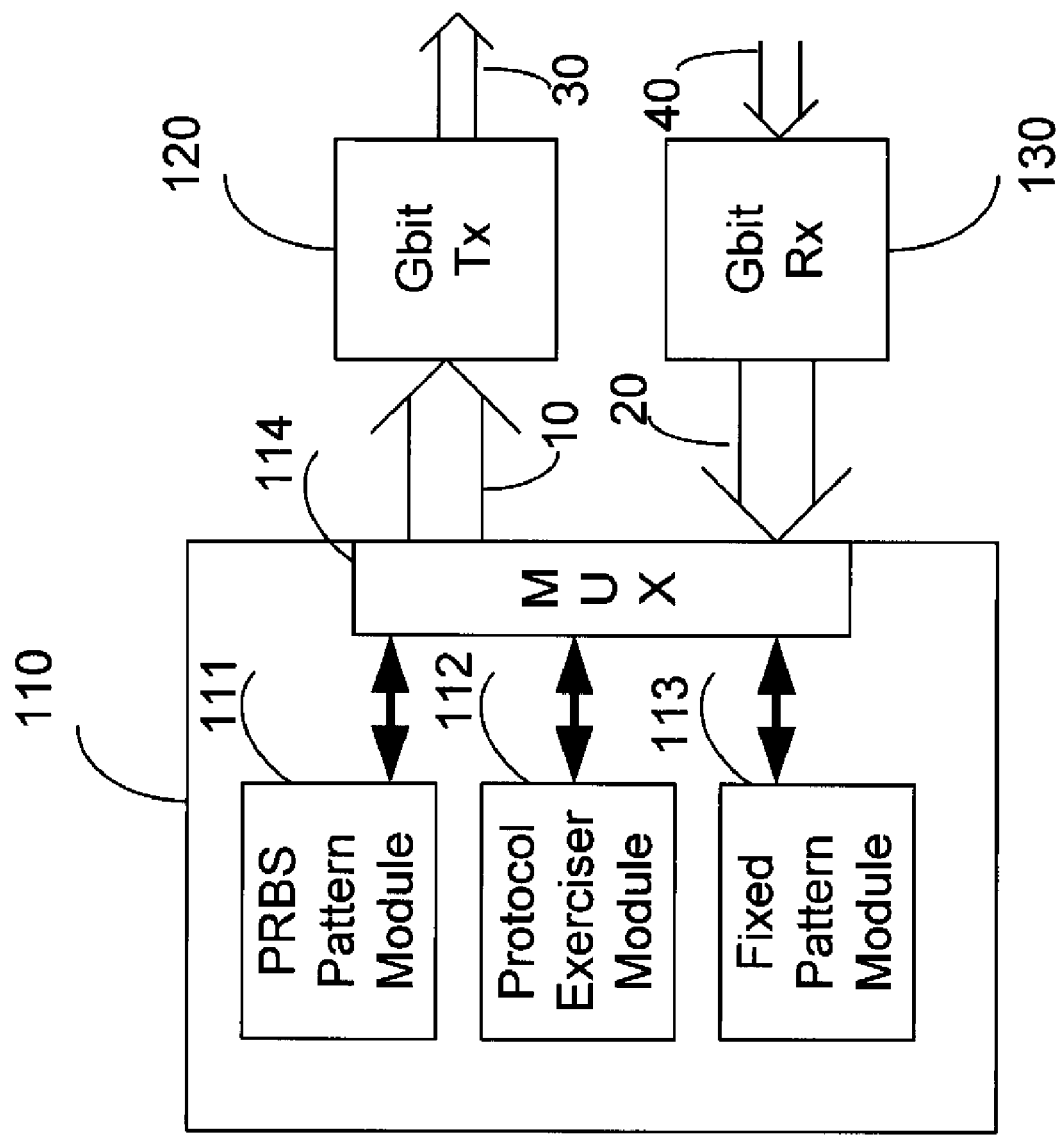
FIG. 2 depicts the internal major blocks of the GPP, including a logic block, a Gigabit transmitter and a Gigabit receiver in accordance with the invention.

FIG. 2 illustrates the internal building blocks of GPP unit 100. GPP unit 100 is preferably implemented in a Field Programmable Gate Array (FPGA) (although other appropriate implementation mechanisms may of course be employed) which has all the building blocks required to perform the various traffic generation and serial communication protocol reception tasks in accordance with the invention. The FPGA Fabric 110 is comprised of four sub blocks. The first two, a PRBS generator 111 and a Fixed pattern generator 113, along with accompanying error detectors, essentially have the functionality of a standard BERT system. FPGA Fabric 110 further preferably includes a Protocol Exerciser module 112 that comprises the protocol awareness brains in accordance with the invention, and is responsible for communicating with the DUT 300 and placing it into a desired correct test mode. Also included is a multiplexer 114 which directs parallel buses to/from the FPGA fabric from/to a front end Gigabit Transmitter 120 and Receiver 130.

Gigabit Transmitter 120 and Gigabit Receiver 130 are implemented in the FPGA MGT(Multi Gigabit Transceiver) blocks. Gigabit Transmitter 120 preferably receives parallel bus signals from FPGA Fabric 110 and converts these received signals into a serial bit stream. As noted above, however, the signal quality of this serial bit stream is not good enough to qualify and characterize receivers at the signal level. This is at least in part because the shape of the signals, and amount of jitter present in the signals are unknown and cannot be controlled. Therefore, this generated serial bit stream is transmitted to AFE 200 for readjustment of the signal physical characteristics. When testing a device and a return signal is received, Gigabit Receiver 130 receives the returned bit stream from AFE 200 and converts it to a parallel signal to be provided on a parallel bus to FPGA Fabric 110.

Figure 3:
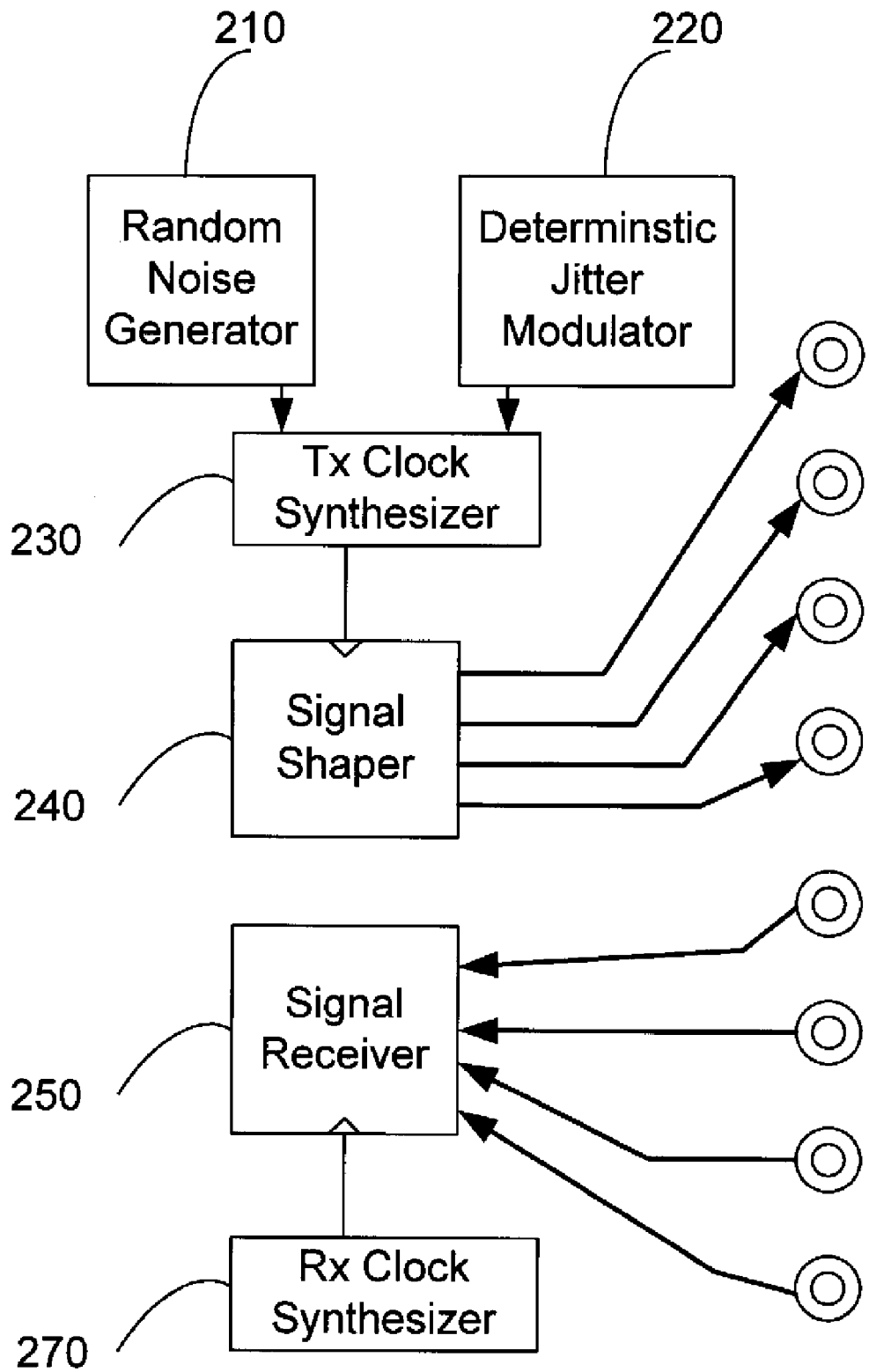
FIG. 3 illustrates the major blocks of the AFE of FIG. 1, including a Random Noise Generator, a Deterministic Jitter Generator, a Transmitter Clock Synthesizer, a Signal Shaper, a Signal Receiver and a Receiver Clock Synthesizer in accordance with the invention.

FIG. 3 illustrates the internal building blocks of AFE 200. A Signal Shaper 240 receives a stimulating serial stream 10 from a GPP 100. Shaper 240 is a synchronous block that is clocked by a Transmit Clock Synthesizer 230, which synthesizes a clean clock. This clean clock can be modulated with both Random and Deterministic jitter components, these jitter components being driven by a Random Noise Generator 210 and a Deterministic Jitter Modulator 220. The sum of these jitter components is seen directly on the output 30 of Signal Shaper 240 as the signal including the jitter components serves as the clock source for the synchronous element in signal shaper 240. Signal shaper 240 also includes signal shaping capabilities, such as voltage amplitude control, rise and fall time control, pre-emphasis control and ISI jitter and noise additions. When none of the jitter and noise components are active, signal 30 is provided as a clean signal with very minimal jitter (including only the intrinsic jitter of the tool), and thus an eye diagram opening would be at its maximum level. Signal Receiver unit 250 preferably includes an independent Clock Synthesizer source 270, and is capable of moving the vertical threshold of the receive signal and the sampling time point of the received signal. By providing such flexibility of moving both the sampled time and vertical voltage threshold, it is possible to perform statistical analysis on the signal transmitted from the DUT 300. This analysis serves for creating such graphs as eye diagram, bathtub curves and eye contour among others.

Figure 4:
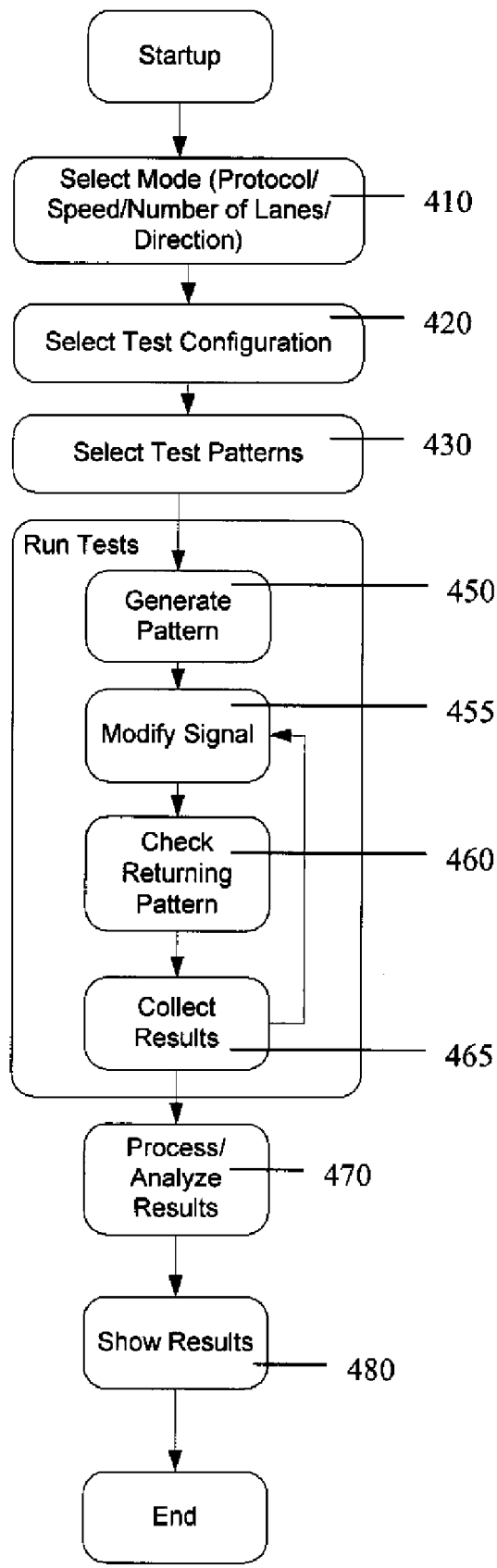
FIG. 4 is a flowchart diagram depicting information flow during operation in accordance with the invention.

Referring next to FIG. 4, a description of operation of a preferred embodiment of the invention will now be provided. As is shown in FIG. 4, after startup, setup of the apparatus in accordance with the invention is performed. Such setup includes first, selecting a test mode at step 410, which in turn further comprises at least defining a protocol to be tested, a speed of operation, a number of lanes to be tested, and a direction of information flow along those lanes. Thereafter, a test configuration is selected at step 420 and various test patterns are selected at step 430.

After setup, various tests are performed. These tests comprise the steps of first generating one or more test patterns at step 450 and then modifying a signal according to the test patterns and in accordance with the other test protocols at step 455. This modified signal is forwarded to a DUT, and a returning pattern is received therefrom by the testing apparatus. This return pattern is checked, preferably by comparison to an expected return pattern at step 460. The results of this comparison are collected at step 465, and if additional testing is to be performed, processing returns to step 455 and the signal is once again modified either in a similar or different manner according to the implemented test procedure. After all testing is performed, processing passes to step 470 where the collected results are further processed and analyzed, and thereafter results are displayed or otherwise provided to a user. Processing then ends.

Therefore, in accordance with the invention, a user is able to test the physical layer of a high speed serial communication device while maintaining an awareness of the protocol being implemented by the device.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed:
1. A physical layer test and measurement system with protocol awareness, comprising:
   an analog front end (AFE) unit with physical layer testing capabilities the AFE unit adapted to generate and provide a signal to a device under test modulated to selectively include one of random and deterministic jitter components, the device under test acting as a signal receiver, the AFE unit further adapted to receive a signal from the device under test, the device under test acting as a signal transmitter; and
   a general purpose platform (GPP) with protocol awareness capabilities of one or more predefined protocols, the GPP further being adapted to perform testing on an input signal received from the AFE to determine errors on a protocol packet level at a plurality of different speeds of operation of the device under test in accordance with one or more of the one or more predefined protocols, and to provide a serial bit stream in accordance with one or more of the one or more predefined protocols, and in accordance with one or more results of the performed testing, to the AFE for use in generating the signal to be provided to the device under test.

2. The system of claim 1, wherein the GPP includes at least one of:
   a PRBS and Fixed Pattern Modules to generate and analyze traditional BERT bit patterns;
   a Protocol Exerciser Module to generate and analyze protocol level packets and frames;
   a Mux to multiplex the outgoing parallel bit stream from the 3 sources (PRBS Patten Module, Protocol Exerciser Module and Fixed Pattern Module) and to de-multiplex the incoming parallel bit stream to these 3 destinations;
   a Gigabit Transmitter to convert the incoming parallel bit stream to a serial bit stream; and
   a Gigabit Receiver to convert the incoming serial bit stream to parallel bit stream.

3. The system of claim 1, wherein the AFE unit includes at least one of:
   a Signal Shaper to generate programmable signal waveforms based on the digital value of the incoming bit stream from the GPP, the signal shape parameters and the jitter characteristics as programmed by a user;
   a Tx Clock Synthesizer to synthesize a clean clock source to the Signal Shaper;
   a Deterministic Jitter Modulator to generate and add a deterministic jitter component to the clock source of the Signal Shaper so the output of the Signal Shaper will have the same jitter component;
   a Random Noise Generator to generate and add a random jitter component to the clock source of the Signal Shaper so the output of the Signal Shaper will have the same jitter component;
   a Signal Receiver to receive the signal from the Device Under Test and vary its time base and voltage threshold in order to analyze it; and
   an Rx Clock Synthesizer to synthesize a clock source for the Signal Receiver Circuitry.

4. The system of claim 1, further comprising a counter for counting a number of protocol packets corresponding to one or more of the one or more predefined protocols including an error.

5. The system of claim 4, further comprising a calculator for calculating a bit error rate in accordance with the counted number of protocol packets including an error.

6. The system of claim 4, wherein the counted number of protocol packets including an error is different from a number of bit errors.

7. The system of claim 1, wherein errors are determined at a protocol layer by determining one or more bit errors in the signal, and grouping these errors by protocol defined packets.

8. The physical layer test and measurement system of claim 1, further comprising:
   wherein the AFE unit is adapted to modulate the serial bit stream to include at least one of random and deterministic jitter, to transmit the modulated serial bit stream to the device under test, and to receive a returned serial bit stream from the device under test; and
   wherein the returned serial bit stream is forwarded to the GPP for testing.

9. The physical layer test and measurement system of claim 8, wherein the serial bit stream is modulated in accordance with one or more test protocols.

10. The physical layer test and measurement system of claim 9, wherein each of the one or more test protocols further defines at least one of a protocol to be tested, a speed of operation, a number of lanes to be tested, and a direction of information along those lanes.

11. The physical layer test and measurement system of claim 8, wherein the testing by the GPP comprises comparing the returned serial bit stream to an expected returned serial bit stream.

12. The physical layer test and measurement system of claim 8, wherein the AFE unit is adapted to further signal shape the modulated serial bit stream, and includes at least one of voltage amplitude control, rise and fall time control, pre-emphasis control, and the ability to add ISI jitter and noise.

13. The physical layer test and measurement system of claim 8, wherein the device under test is tested as a receiving device.

14. The physical layer test and measurement system of claim 8, wherein the GPP is adapted to place the device under test into a desired test mode.

15. The physical layer test and measurement system of claim 8, wherein the AFE unit further comprises a receiver unit including an independent clock synthesizer source capable of moving at least one of a vertical threshold and a sampling time point of the returned serial bit stream.

16. The physical layer test and measurement system of claim 8, wherein the GPP unit is implemented in a field programmable gate array.

17. A method for testing for protocol errors in a data stream, comprising the steps of:
   generating a signal by an analog front end (AFE) in accordance with one or more predefined protocols comprising at least a plurality of different speeds of operation of a device under test modulated to selectively include at least one of random and deterministic jitter components;
   transmitting the modulated signal to the device under test;
   receiving an input data signal from the device under test at the AFE with physical layer testing capabilities;
   performing testing on the input signal to determine bit errors in the data signal in accordance with a selected one of the one or more predefined protocols;
   grouping the determined bit errors into protocol defined packets in accordance with the selected one of the one or more predefined protocols;

determining a number of protocol packets in accordance with the selected one of the one or more predefined protocols containing one or more bit errors;

determining an error ratio in accordance with the determined number of protocol packets;

generating a further modulated signal by the analog front end (AFE) in accordance with one or more of the performed testing and in accordance with the predefined protocols modulated to selectively include at least one of random and deterministic jitter components; and transmitting the further modulated signal to the device under test.

18. The method of claim 17, further comprising the step of calculating a bit error ratio in accordance with the counted number of protocol packets including an error.

19. The method of claim 18, wherein the counted number of protocol packets including an error is different from a number of bit errors.

* * * * *